(12) United States Patent
Utaka

(10) Patent No.: US 9,454,668 B2
(45) Date of Patent: Sep. 27, 2016

(54) INFORMATION PROCESSING SYSTEM, INFORMATION PROCESSING APPARATUS, TERMINAL APPARATUS, AND CONTROL METHOD

(71) Applicant: FUJITSU LIMITED, Kawasaki-shi, Kanagawa (JP)

(72) Inventor: Masayoshi Utaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 14/526,682

(22) Filed: Oct. 29, 2014

(65) Prior Publication Data

US 2015/0135009 A1 May 14, 2015

(30) Foreign Application Priority Data

Nov. 14, 2013 (JP) .................................. 2013-236325

(51) Int. Cl.
*G06F 21/62* (2013.01)
*G06F 13/42* (2006.01)
*G06F 11/20* (2006.01)
*G06F 11/07* (2006.01)

(52) U.S. Cl.
CPC ............ *G06F 21/62* (2013.01); *G06F 13/4282* (2013.01); *G06F 11/0709* (2013.01); *G06F 11/0757* (2013.01); *G06F 11/2023* (2013.01)

(58) Field of Classification Search
CPC ........... G06F 11/0709; G06F 11/2023; G06F 11/2025; G06F 21/54; G06F 21/60; G06F 21/602; G06F 21/62; G06F 21/79; G06F 21/80; H04L 69/40
See application file for complete search history.

(56) References Cited

U.S. PATENT DOCUMENTS

| | | | | |
|---|---|---|---|---|
| 7,042,837 B1* | 5/2006 | Cassiday | ................. | H04L 45/00 370/225 |
| 7,571,343 B1* | 8/2009 | Xiang | .................... | H04L 69/40 709/203 |
| 2010/0014520 A1 | 1/2010 | Matsumoto et al. | | |
| 2013/0061298 A1* | 3/2013 | Longobardi | ............ | G06F 21/42 726/6 |

FOREIGN PATENT DOCUMENTS

| | | |
|---|---|---|
| CN | 103034603 | 4/2013 |
| JP | 7-200362 | 8/1995 |
| JP | 2006-195709 | 7/2006 |
| JP | 2008-305353 | 12/2008 |

OTHER PUBLICATIONS

Extended European Search Report dated Apr. 15, 2015 in corresponding European Patent Application No. 14191060.4.

* cited by examiner

*Primary Examiner* — Joseph Kudirka
(74) *Attorney, Agent, or Firm* — Staas & Halsey LLP

(57) ABSTRACT

When a failure of a reply in response to a packet is detected, A terminal apparatus transmits, to a stand-by information processing apparatus, multiple packets in which multiple divided command statements are attached to header areas thereof, the divided command statements being obtained by dividing into multiple statements a command statement for a switch command to switch from a currently-operated information processing apparatus to the stand-by information processing apparatus. The stand-by information processing apparatus stores each of the divided command statements that are attached to the packets that are transmitted from the terminal apparatus. The stand-by information processing apparatus performs a switch operation to switch from the currently-operated information processing apparatus to the stand-by the information processing apparatus in accordance with the switch command that is generated from the stored divided command statements.

9 Claims, 8 Drawing Sheets

| SERVER NAME | IP ADDRESS | CLUSTER NAME | APP NAME | THRESHOLD FOR SERVER'S PROCESSING | TIME-OUT PERIOD | SWITCH COMMAND |
|---|---|---|---|---|---|---|
| SERVER 1 | 192.168.0.1 | CL1 | APP X | 5 SECONDS | 30 SECONDS | 35124 |
| SERVER 2 | 192.168.0.2 | CL1 | APP X | 5 SECONDS | 30 SECONDS | 15432 |
| SERVER A | 192.168.0.100 | - | - | - | - | - |

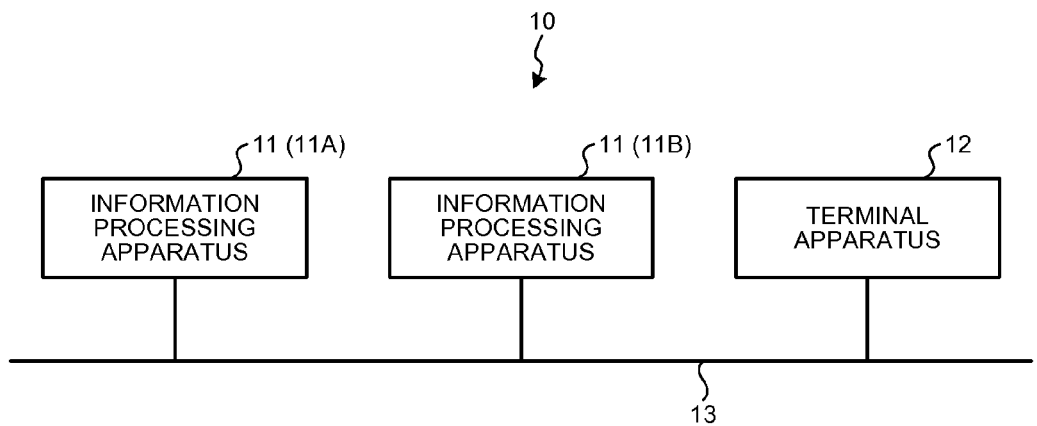
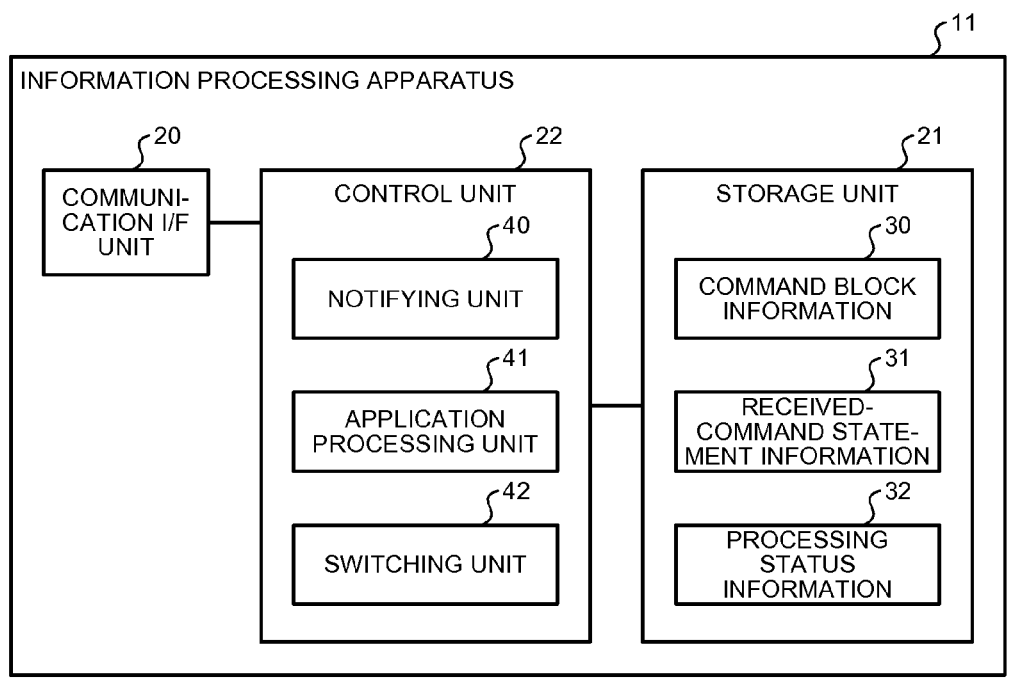

INFORMATION IN WHICH DATA BLOCKS ARE REARRANGED
(SHUFFLED) IN RANDOM ORDER

| SERIAL NO. | RECEIVED COMMAND | PROCESSING START TIME | PROCESSING COMPLETION TIME | THRESHOLD FOR SERVER'S PROCESSING |
|---|---|---|---|---|
| 1 | 0 | 00:01:00 | 00:04:00 | 00:05:00 |

| SERVER NAME | IP ADDRESS | CLUSTER NAME | APP NAME | THRESH-OLD FOR SERVER'S PRO-CESSING | TIME-OUT PERIOD | SWITCH COMMAND |
|---|---|---|---|---|---|---|
| SERVER 1 | 192.168.0.1 | CL1 | APP X | 5 SECONDS | 30 SECONDS | 35124 |
| SERVER 2 | 192.168.0.2 | CL1 | APP X | 5 SECONDS | 30 SECONDS | 15432 |
| SERVER A | 192.168.0.100 | - | - | - | - | - |

| SERIAL NO. | RECEIVED COMMAND | PROCESSING START TIME | PROCESSING COMPLETION TIME | THRESHOLD FOR SERVER'S PROCESSING |
|---|---|---|---|---|
| 1 | 0 | 00:01:00 | | 00:05:00 |

INFORMATION PROCESSING SYSTEM, INFORMATION PROCESSING APPARATUS, TERMINAL APPARATUS, AND CONTROL METHOD

CROSS-REFERENCE TO RELATED APPLICATIONS

This application is based upon and claims the benefit of priority of the prior Japanese Patent Application No. 2013-236325, filed on Nov. 14, 2013, the entire contents of which are incorporated herein by reference.

FIELD

The embodiments discussed herein are related to an information processing system, an information processing apparatus, a terminal apparatus, a control program, and a control method.

BACKGROUND

High Availability (HA) cluster systems have been known as the technology for improving the reliability and availability of computers. In the HA cluster system, multiple servers are connected to each other to achieve the redundancy of the system.

In the HA cluster system, for example, the servers that constitute the HA cluster system are connected to each other via a dedicated network so that they monitor each other via the dedicated network to detect a failure. For example, in the HA cluster system, each server transmits, to a different server via a dedicated network, a signal called a heartbeat for externally notifying that it properly operates, and a different server monitors the signal to detect a failure. In the HA cluster system, if a stand-by server detects stoppage of a currently-operated server that performs processing in accordance with a processing request from a terminal apparatus or a failure during an operation, a switchover is made so that the stand-by server performs processing as a currently-operated apparatus; thus, processing is continuously performed while a failure occurs.

[Patent Literature 1] Japanese Laid-open Patent Publication No. 2008-305353

Furthermore, in the HA cluster system, even if a failure occurs in a server, a heartbeat communication sometimes continues. For example, because of a high reliability of an operating system (OS), even if part of the OS does not operate, the overall server can operate. Therefore, in some cases, when a failure occurs in part of the OS, the heartbeat properly operates in the server while processing of the application does not properly operate.

For this reason, in the HA cluster system, for example, it is possible that a terminal apparatus also monitors a server and, when detecting a failure, switches a currently-operated apparatus.

However, if the terminal apparatus transmits a switch command, there is a possibility that a switch command statement is intercepted by a malicious user and the command statement is leaked. If the command statement is leaked as described above, there is a possibility of hacking of the system.

SUMMARY

According to an aspect of an embodiment, an information processing system includes a terminal apparatus; a currently-operated apparatus that receives a request from the terminal apparatus and performs processing in accordance with the request; and a stand-by apparatus, wherein the terminal apparatus includes a detecting unit that detects a failure of a reply in response to a packet that is transmitted to the currently-operated apparatus; and a transmission control unit that, when a failure of the reply is detected, transmits multiple packets to the stand-by apparatus, the packets having multiple divided command statements attached to header areas thereof, and the divided command statements being obtained by dividing into multiple statements a command statement for a switch command to switch from the currently-operated apparatus to the stand-by apparatus, and the stand-by apparatus includes a storage unit that stores each of the divided command statements that are attached to the packets that are transmitted from the terminal apparatus; and a switching unit that performs a switch operation to switch from the currently-operated apparatus to the stand-by apparatus in accordance with the switch command that is generated from the divided command statements.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram that illustrates an example of the schematic configuration of an information processing system;

FIG. 2 is a diagram that illustrates an example of the functional configuration of an information processing apparatus;

DESCRIPTION OF EMBODIMENTS

Figures 3, 4:
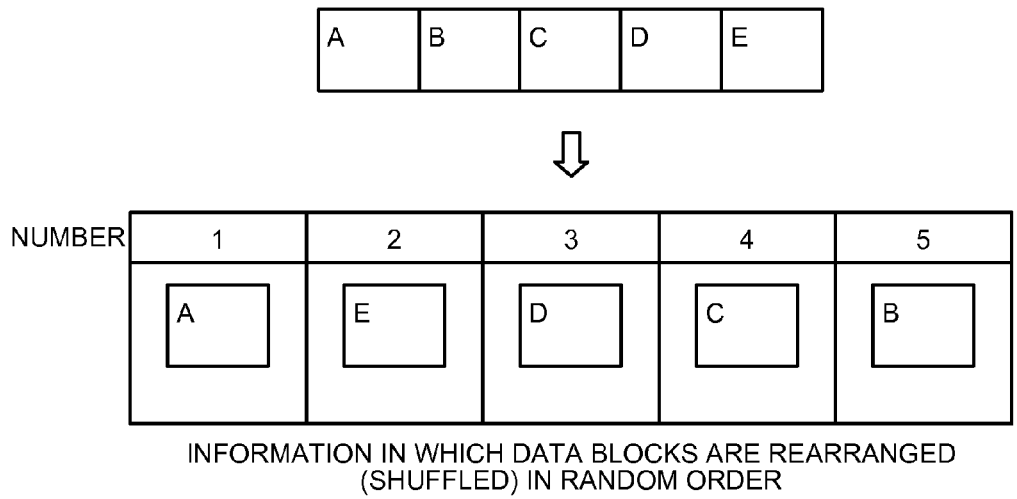
FIG. 3 is a diagram that illustrates an example of the data structure of a stored command statement.
FIG. 4 is a table that illustrates an example of the data structure of processing status information.

Preferred embodiments of the present invention will be explained with reference to accompanying drawings. Furthermore, the present invention is not limited to the embodiments. Moreover, each of the embodiments may be combined as appropriate to the degree where there is no contradiction in the details of operations.

[a] First Embodiment

An explanation is given of an information processing system 10 according to a first embodiment. FIG. 1 is a diagram that illustrates an example of the schematic configuration of the information processing system. The information processing system 10 includes multiple information processing apparatuses 11 and a terminal apparatus 12. In the information processing system 10, the multiple information processing apparatuses 11 constitute an HA cluster to improve the reliability and availability of the system. The information processing apparatuses 11 and the terminal apparatus 12 can exchange various types of information. For example, the information processing apparatuses 11 and the terminal apparatus 12 are communicatively connected to one another via a network 13 so that they can exchange various types of information. The form of the network 13 may be wired or wireless, and it may be any communication network, such as a Local Area Network (LAN) or Virtual Private Network (VPN).

In the information processing system 10, the information processing apparatus 11 provides a predetermined function in accordance with a processing request from the terminal apparatus 12. This type of information processing system 10 is used in, for example, the financial industry where the reliability and availability of systems are needed. Furthermore, the example of FIG. 1 illustrates that the multiple information processing apparatuses 11, i.e., two information processing apparatuses 11A and 11B, constitute the HA cluster; however, the disclosed system is not limited to the above, and the three or more information processing apparatuses 11 may constitute the HA cluster. Moreover, the example of FIG. 1 illustrates that a processing request is received from the single terminal apparatus 12; however, the disclosed system is not limited to the above, and a processing request may be received from the multiple terminal apparatuses 12.

The information processing apparatus 11 is a physical server in which application software operates to provide a predetermined function, and it is, for example, a server computer that is provided in a data center or each company. According to the present embodiment, the two information processing apparatuses 11A and 11B constitute the HA cluster. The information processing apparatuses 11A and 11B have almost the same configuration. One of the information processing apparatuses 11A and 11B operates as a currently-operated apparatus that performs processing in accordance with a request, and the other one of them operates as a stand-by apparatus that backs up when a failure occurs in the currently-operated apparatus. The information processing apparatus 11 that currently operates is a currently-operated apparatus. The information processing apparatus 11 that operates to stand by is a stand-by apparatus.

The terminal apparatus 12 is an apparatus that requests processing. The terminal apparatus 12 requests the currently-operated information processing apparatus 11 to perform processing. Furthermore, the terminal apparatus 12 may be a client terminal that receives an operation from a user and requests the information processing apparatus 11 to perform processing. Moreover, the terminal apparatus 12 may be a server that receives a user's operation from a different client terminal and requests the information processing apparatus 11 to perform processing.

Next, an explanation is given, with reference to FIG. 2, of the more detailed configuration of the information processing apparatus 11. FIG. 2 is a diagram that illustrates an example of the functional configuration of the information processing apparatus. As illustrated in FIG. 2, the information processing apparatus 11 includes a communication interface (I/F) unit 20, a storage unit 21, and a control unit 22.

The communication I/F unit 20 is an interface that has at least one port and that controls a communication with the network 13. The communication I/F unit 20 transmits and receives various types of information to and from a different apparatus via the network 13. For example, the communication I/F unit 20 receives a processing request from the terminal apparatus 12.

The storage unit 21 is a storage device that stores various types of data. For example, the storage unit 21 is a storage device, such as a hard disk, Solid State Drive (SSD), or optical disk. Furthermore, the storage unit 21 may be a data-rewritable semiconductor memory, such as a Random Access Memory (RAM), flash memory, or Non Volatile Static Random Access Memory (NVSRAM).

The storage unit 21 stores the OS and various programs that are executed by the control unit 22. For example, the storage unit 21 stores various programs that are used for a control on switching between a stand-by apparatus and a currently-operated apparatus. Furthermore, the storage unit 21 stores various types of data that are used in programs that are executed by the control unit 22. For example, the storage unit 21 stores command block information 30, received-command statement information 31, and processing status information 32.

The command block information 30 is the data that stores command statements for various commands to control the information processing apparatus 11 of the HA cluster. According to the present embodiment, to prevent leakage of command statements due to eavesdropping, a command statement is divided and rearranged in random order, and blocks of the command statement are stored in the command block information 30. For example, a command statement for a switch command to switch between the currently-operated apparatus and the stand-by apparatus is compressed by using a predetermined compression format, the compressed command statement data is divided into multiple blocks, and the blocks of the command statement are rearranged in random order and are stored in the command block information 30.

FIG. 3 is a diagram that illustrates an example of the data structure of a stored command statement. In the example of FIG. 3, the command statement for a switch command to switch between the currently-operated apparatus and the stand-by apparatus is compressed by using a predetermined compression format, and the compressed command statement data is divided into blocks A to E. Then, the blocks A to E are rearranged in random order, and the numbers 1 to 5 are assigned to them in order, starting from the beginning, and are stored in the command block information 30. In the example of FIG. 3, the blocks A to E are rearranged in the order of "A", "E", "D", "C", and "B", and the numbers 1 to 5 are assigned to them in order, starting from the beginning. The command block information 30 stores the rearranged blocks A to E of the command statement together with the numbers. If the blocks A to E, which are arranged in the order of "A", "E", "D", "C", and "B", are rearranged in the order of the numbers "1", "5", "4", "3", and "2", the blocks A to E are arranged in the proper order.

With reference back to FIG. 2, the received-command statement information 31 is the data that stores the information on the command statement that is received from the terminal apparatus 12. According to the present embodiment, the numbers that are associated with the blocks of command statements are received as various commands from the terminal apparatus 12. The received-command statement information 31 stores the number of the block of the command statement that is received from the terminal apparatus 12.

The processing status information 32 is the data that stores various types of information on the processing status of the processing that is requested by the terminal apparatus 12. FIG. 4 is a table that illustrates an example of the data structure of processing status information. As illustrated in FIG. 4, the processing status information 32 contains the items "serial No.", "received command", "processing start time", "processing completion time", and "threshold for server's processing". The item "serial No." is the field that stores the identification information for identifying a received packet. A unique serial number that has a combination of numbers and characters is assigned to a received packet to identify it. The serial number assigned to a packet is stored in the item "serial No.". The item "received command" is the field that stores the number of the block of the command statement that is included in a received packet. Here, according to the present embodiment, when the terminal apparatus 12 gives an instruction to the information processing apparatus 11, the number of the block of the command statement in the instruction is stored in the header of the packet for transmission. The number of the block of the command statement stored in the header of the received packet is stored in the item "received command". Furthermore, the number "0" indicates that there is no block of a command statement in the instruction. The item "processing start time" is the field that stores the time when processing for a packet is started. According to the present embodiment, the time when a packet is received is stored in the item "processing start time" as the time when processing for the packet is started. Furthermore, according to the present embodiment, it is assumed that the information processing apparatuses 11A and 11B and the terminal apparatus 12 are synchronized with one another in time. For example, the information processing apparatuses 11A and 11B and the terminal apparatus 12 use the server that stores the reference time and the Network Time Protocol (NTP) for time synchronization, whereby they are synchronized in time.

The item "processing completion time" is the field that stores the time when processing for a packet is completed. According to the present embodiment, the time when the packet of a reply is transmitted in response to a received packet is stored in the item "processing completion time" as the time when processing for the packet is completed. The item "threshold for server's processing" is the field that stores a processing time threshold by which it is determined that a processing time over occurs. Here, in the information processing apparatus 11, processing is sometimes stopped or delayed due to a failure, or the like, of the OS. The threshold for server's processing is the threshold for detecting the occurrence of such a failure. The threshold for server's processing is set by the terminal apparatus 12 in the header of a packet and is notified to the information processing apparatus 11.

With reference back to FIG. 2, the control unit 22 is a device that controls the information processing apparatus 11. An electronic circuit, such as a central processing unit (CPU) or a micro processing unit (MPU), or an integrated circuit, such as an application specific integrated circuit (ASIC) or Field Programmable Gate Array (FPGA), may be used as the control unit 22. The control unit 22 includes an internal memory that stores programs that define various operation steps and control data, thereby performing various operations. The control unit 22 serves as various processing units when various programs are executed. For example, the control unit 22 includes a notifying unit 40, an application processing unit 41, and a switching unit 42.

The notifying unit 40 is a processing unit that make various notifications. According to the present embodiment, the terminal apparatus 12 broadcasts a query as to whether there is an apparatus that is configured as an HA cluster during an initializing operation of the apparatus, such as during a start-up. When a query is received from the terminal apparatus 12 during the broadcast, the notifying unit 40 notifies the terminal apparatus 12 of various types of information on the cluster. For example, the notifying unit 40 notifies the terminal apparatus 12 of the computer name of the apparatus it belongs to, the IP address, the cluster name for identifying the cluster, and the application name for which the cluster is configured. Furthermore, the notifying unit 40 makes a notification of a command statement to control the cluster. Moreover, to prevent leakage of command statements due to eavesdropping, the notifying unit 40 divides a command statement, rearranges it in random order, and stores it in the command block information 30. For example, as illustrated in FIG. 3, the notifying unit 40 compresses a command statement for a switch command to switch between the currently-operated apparatus and the stand-by apparatus by using a predetermined compression format and divides the compressed command statement data into the blocks A to E. Then, the notifying unit 40 rearranges the blocks A to E in random order, assigns the numbers 1 to 5 to them in order, starting from the beginning, and stores them in the command block information 30. The notifying unit 40 notifies the terminal apparatus 12 of the numerical order that indicates the proper numerical order of the command statement blocks that are rearranged in random order. For example, the notifying unit 40 notifies the terminal apparatus 12 of the numerical order "15432" that indicates the proper order of the blocks A to E that are rearranged in random order.

The application processing unit 41 is a processing unit that performs processing of the application. For example, in response to a processing request from the terminal apparatus 12, the application processing unit 41 performs application processing that is in accordance with the request. Here, the application processing unit 41 updates the processing status information 32. For example, when the packet of a processing request is received from the terminal apparatus 12, the application processing unit 41 assigns a unique serial number to the received packet. Then, the application processing unit 41 registers, in the processing status information 32, the assigned serial number, the time when the packet is received, the number of the block of the command statement that is included in the header of the packet, and the processing time threshold that is included in the header of the packet. Then, the application processing unit 41 performs processing of the application in accordance with the processing request. When the application processing unit 41 completes processing on the packet, it registers the processing completion time in the processing status information 32 and transmits, to the terminal apparatus 12, the packet of the reply in response to the received packet. Furthermore, the application processing unit 41 measures the processing period of the processing of the application. For example, the application processing unit 41 measures the processing period of the processing of the application by using the difference between the processing completion time and the processing start time. Furthermore, the application processing unit 41 may measure, as the processing period, the time period that elapses after the time when the packet is received. If the processing period is longer than the processing time threshold, the application processing unit 41 notifies the terminal apparatus 12 of a processing time over.

The switching unit 42 is a processing unit that performs control on switching between the stand-by and the currently-operated information processing apparatuses 11 that constitute the HA cluster. For example, when a packet is received from the terminal apparatus 12, the switching unit 42 stores, in the received-command statement information 31, the number of the block of the command statement that is included in the header of the received packet. Then, the switching unit 42 switches between the stand-by and the currently-operated information processing apparatuses 11 when the command statement for the switch command can be generated by using the numbers of the blocks of the command statements that are stored in the received-command statement information 31. For example, the switching unit 42 integrates the blocks that correspond to the number of divided blocks of the command statement in order, starting from the block with the number of the newly received packet. The switching unit 42 performs switching if the command statement for the switch command is obtained as a result of decompression of the integrated data. For example, if the switching unit 42 belongs to the currently-operated information processing apparatus 11, it transmits a switch instruction to the switching unit 42 of the stand-by information processing apparatus 11 to switch it to the currently-operated apparatus, and it shifts to the stand-by information processing apparatus 11. Furthermore, if the switching unit 42 belongs to the stand-by information processing apparatus 11, it transmits a switch instruction to the switching unit 42 of the currently-operated information processing apparatus 11 to switch it to the stand-by apparatus, thereby performing a switch operation to switch from the currently-operated information processing apparatus 11 to the stand-by information processing apparatus 11. Moreover, the switching unit 42 shifts to the currently-operated information processing apparatus 11.

Figures 5, 6:
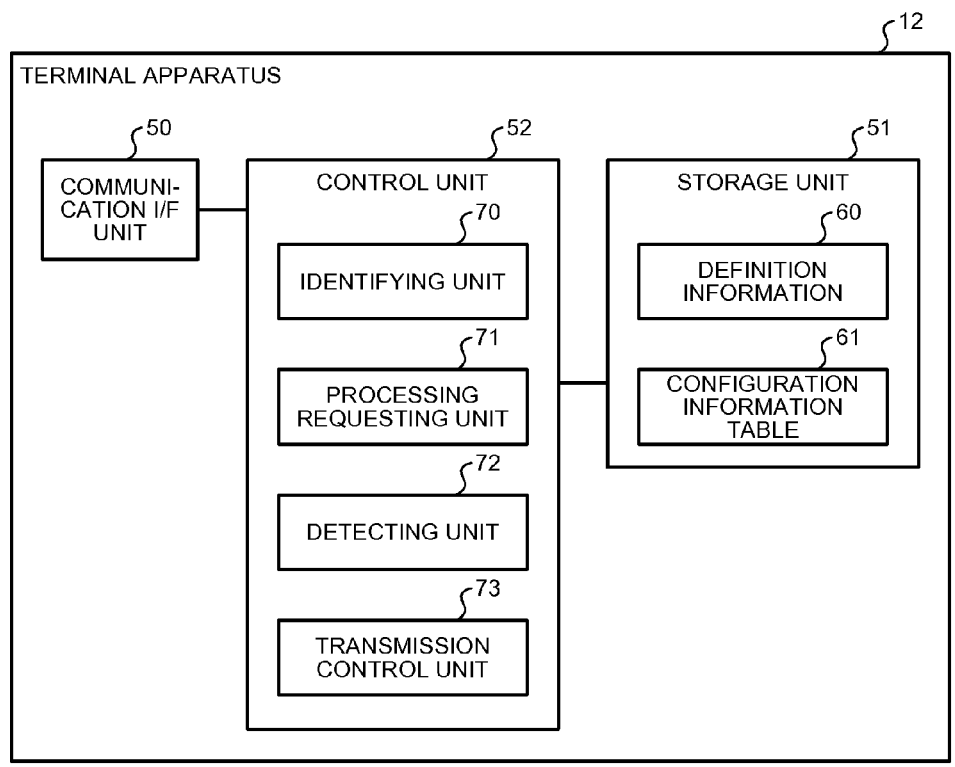
FIG. 5 is a diagram that illustrates an example of the functional configuration of a terminal apparatus.
FIG. 6 is a table that illustrates an example of the data structure of a configuration information table.

Next, an explanation is given of the more detailed configuration of the terminal apparatus 12. FIG. 5 is a diagram that illustrates an example of the functional configuration of the terminal apparatus. As illustrated in FIG. 5, the terminal apparatus 12 includes a communication I/F unit 50, a storage unit 51, and a control unit 52.

The communication I/F unit 50 is the interface that has at least one port and that controls a communication with the network 13. The communication I/F unit 50 transmits and receives various types of information to and from other apparatuses via the network 13. For example, the communication I/F unit 50 transmits a processing request to the currently-operated information processing apparatus 11.

The storage unit 51 is a storage device that stores various types of data. For example, the storage unit 51 is a storage device, such as a hard disk, SSD, or optical disk. Furthermore, the storage unit 51 may be a data-rewritable semiconductor memory, such as a RAM, flash memory, or NVSRAM.

The storage unit 51 stores the OS and various programs that are executed by the control unit 52. For example, the storage unit 51 stores various programs that are used during a control that is performed when a packet is received. Furthermore, the storage unit 51 stores various types of data that are used for programs that are executed by the control unit 52. For example, the storage unit 51 stores definition information 60 and a configuration information table 61.

The definition information 60 is the data that stores various types of setting information. For example, the definition information 60 stores the processing time threshold by which a processing time over is determined. Furthermore, the definition information 60 stores the time-out period threshold by which a communication time-out is determined. The above-described various types of setting information are set in the definition information 60 by, for example, an administrator of the system. Furthermore, a single setting of the processing time threshold and the time-out period threshold may be made in each of the information processing apparatuses 11. Furthermore, the processing time threshold and the time-out period threshold may be individually set in each of the information processing apparatuses 11. Furthermore, the definition information 60 may be downloaded from, for example, a different server. Moreover, various types of setting information that are stored in the definition information 60 may be acquired from a different server, for example, when the setting information is used.

The configuration information table 61 is the data that stores various types of configuration information on each apparatus that is included in the system. FIG. 6 is a table that illustrates an example of the data structure of the configuration information table. As illustrated in FIG. 6, the configuration information table 61 contains various items, i.e., "server name", "IP address", "cluster name", "app name", "threshold for server's processing", "time-out period", and "switch command". The item "server name" is the field that stores the computer name of an apparatus. The item "IP address" is the field that stores the IP address of an apparatus. The item "cluster name" is the field that, if an apparatus constitutes an HA cluster, stores the information for identifying the cluster. When an HA cluster is configured, the cluster name for identifying the cluster is set. If the apparatus constitutes the HA cluster, the item "cluster name" stores the cluster name. The item "app name" is the field that, if the apparatus constitutes the HA cluster, stores the application name for which the cluster is configured. The item "threshold for server's processing" is the field that stores the processing time threshold by which a processing time over is determined. The item "time-out period" is the field that stores the time-out period threshold by which a communication time-out is determined. The item "switch command" is the field that, if an apparatus constitutes an HA cluster, stores the information on a command statement for a switch command to switch between a currently-operated apparatus and a stand-by apparatus.

The example of FIG. 6 illustrates a state where various types of configuration information are stored in the configuration information table 61, in which the computer name of the information processing apparatus 11A is "server 1", the computer name of the information processing apparatus 11B is "server 2", and the computer name of the terminal apparatus 12 is "server A". The example of FIG. 6 illustrates that the IP address of "server 1" is "192.168.0.1", the IP address of "server 2" is "192.168.0.2", and the IP address of "server A" is "192.168.0.100". Furthermore, it illustrates that "server 1" and "server 2" constitute the cluster whose cluster name is "CL1" and the application name for which the cluster is configured is "app X". Furthermore, it illustrates that, with regard to "server 1" and "server 2", the processing time threshold for determining a processing time over is "5 seconds" and the time-out period threshold for determining a communication time-out is "30 seconds".

Furthermore, it illustrates that, with regard to "server 1", the proper order of the command blocks of the command statement for the switch command to switch between the stand-by apparatus and the currently-operated apparatus is the numbers "35124". Furthermore, it illustrates that, with regard to "server 2", the proper order of the command blocks of the command statement for the switch command to switch between the stand-by apparatus and the currently-operated apparatus is the numbers "15432".

The control unit 52 is a device that controls the terminal apparatus 12. An electronic circuit, such as a CPU or MPU, or an integrated circuit, such as an ASIC or FPGA, may be used as the control unit 52. The control unit 52 includes an internal memory that stores programs that define various operation steps and control data and uses them to perform various operations. The control unit 52 serves as various processing units when various programs are executed. For example, the control unit 52 includes an identifying unit 70, a processing requesting unit 71, a detecting unit 72, and a transmission control unit 73.

The identifying unit 70 is a processing unit that makes various types of identification. For example, the identifying unit 70 identifies various types of configuration information on each of the apparatuses that constitute the system and registers them in the configuration information table 61. During a start-up of the terminal apparatus 12, the identifying unit 70 broadcasts a query as to whether there is an apparatus that is configured as an HA cluster and acquires various types of information on the cluster from each of the information processing apparatuses 11. For example, the identifying unit 70 acquires, from each of the information processing apparatuses 11, the computer name, the IP address, the cluster name, the application name for which the cluster is configured, and the proper numerical order of the command blocks of the command statement for the switch command. According to the present embodiment, the acquired number of the order corresponds to each divided command statement. Furthermore, the identifying unit 70 acquires, from the definition information 60, the processing time threshold and the time-out period threshold. Then, the identifying unit 70 registers, with respect to each apparatus, each piece of the acquired information in the configuration information table 61. Thus, each piece of information that is illustrated in FIG. 6 is registered in the configuration information table 61.

The processing requesting unit 71 is a processing unit that transmits a processing request. For example, the processing requesting unit 71 transmits a processing request to the currently-operated information processing apparatus 11 when it asks for processing of the application that is provided by using the cluster configuration of the information processing system 10. Thus, the currently-operated information processing apparatus 11 performs processing of the application in accordance with a request.

The detecting unit 72 is a processing unit that detects a failure. For example, the detecting unit 72 detects a failure from a reply to the packet that has been transmitted to the currently-operated information processing apparatus 11. For example, the detecting unit 72 detects the occurrence of a time-out failure if a reply to a packet is not obtained within the time-out period threshold. Furthermore, if a reply to a packet is obtained but a notification of a processing time over is made by the currently-operated information processing apparatus 11, the detecting unit 72 detects the occurrence of a processing-time over failure in the information processing apparatus 11.

The transmission control unit 73 is a processing unit that, if the detecting unit 72 detects a failure, transmits a command to switch between the currently-operated apparatus and the stand-by apparatus. For example, if the detecting unit 72 detects the occurrence of a time-out failure, the transmission control unit 73 transmits, to the stand-by information processing apparatus 11, the command statement for the switch command to switch from the currently-operated apparatus to the stand-by apparatus. For example, the transmission control unit 73 reads the stand-by information processing apparatus 11's switch command that is stored in the configuration information table 61. Then, the transmission control unit 73 sequentially generates the packets in which the numbers stored in the switch command are attached to the header areas thereof in order, starting from the beginning, and transmits the generated packets to the stand-by information processing apparatus 11 in the order that they are generated. Specifically, during a one-time occurrence of a time-out failure, multiple packets are transmitted to the stand-by information processing apparatus 11, the packets having the numbers of the switch command sequentially attached to the headers thereof one by one.

Furthermore, for example, if the detecting unit 72 detects the occurrence of a processing-time over failure, the transmission control unit 73 transmits, to the currently-operated information processing apparatus 11, the command statement for the switch command to switch from the currently-operated apparatus to the stand-by apparatus. For example, the transmission control unit 73 reads the currently-operated information processing apparatus 11's switch command that is stored in the configuration information table 61. Then, the transmission control unit 73 generates a packet in which, out of the numbers stored in the switch command, the sequential number that corresponds to the number of times a processing-time over failure is continuously detected is attached to the header area, and transmits the generated packet to the currently-operated information processing apparatus 11. Specifically, during a one-time occurrence of a processing-time over failure, a single packet that has the number of the switch command attached thereto is transmitted to the stand-by information processing apparatus 11. The number that is attached to a packet corresponds to the number of times a processing-time over failure is continuously detected.

Figure 7:
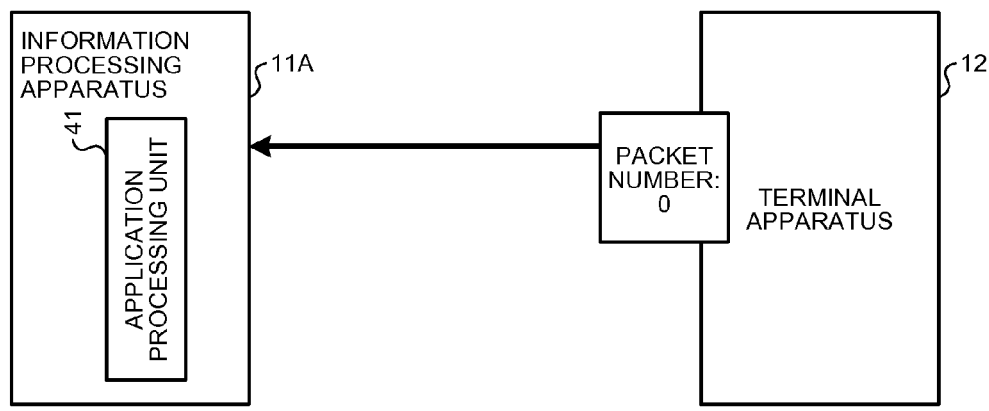
FIG. 7 is a diagram that illustrates an example of the flow of an operation of the information processing system.

Next, an explanation is given of the flow of an operation of the information processing system 10. FIGS. 7 to 10 are diagrams that illustrate an example of the flow of the operation of the information processing system. Furthermore, it is assumed below that the information processing apparatus 11A operates as a currently-operated apparatus and the information processing apparatus 11B operates as a stand-by apparatus. As illustrated in FIG. 7, the terminal apparatus 12 transmits the packet of a processing request to the currently-operated information processing apparatus 11A when it asks for processing of the application that is provided by using the cluster configuration of the information processing system 10. If the terminal apparatus 12 does not give an instruction to switch the information processing apparatus 11A, the number attached to the header of the packet is zero.

Figure 8:
FIG. 8 is a diagram that illustrates an example of the flow of an operation of the information processing system.

As illustrated in FIG. 8, when the information processing apparatus 11A receives the packet of the processing request from the terminal apparatus 12, it assigns a unique serial number to the packet that is received by the application processing unit 41. Then, the application processing unit 41 registers, in the processing status information 32, the serial number, the time when the packet is received, the number of the block of the command statement that is included in the header of the packet, and the processing time threshold that is included in the header of the packet. In the example of FIG. 8, the processing status information 32 has registered therein the serial No. "1", the received command "0", the processing start time "00:01:00", and the threshold for server's processing "00:05:00". The application processing unit 41 performs processing of the application in accordance with the processing request.

Figure 9:
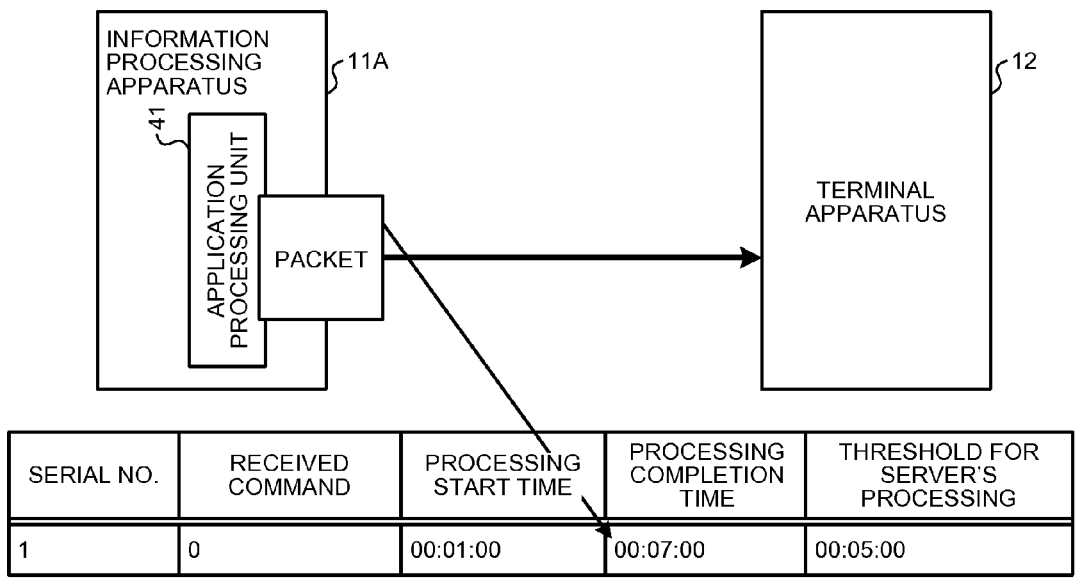
FIG. 9 is a diagram that illustrates an example of the flow of an operation of the information processing system.

As illustrated in FIG. 9, the application processing unit 41 registers the processing completion time in the processing status information 32. In the example of FIG. 9, the processing completion time "00:07:00" is registered in the processing status information 32. Furthermore, the application processing unit 41 transmits, to the terminal apparatus 12, the packet of a reply in response to the received packet. Then, the application processing unit 41 measures the processing period of the processing of the application by using the difference between the processing completion time and the processing start time and, if the processing period is longer than the processing time threshold, notifies the terminal apparatus 12 of a processing time over.

Figure 10:
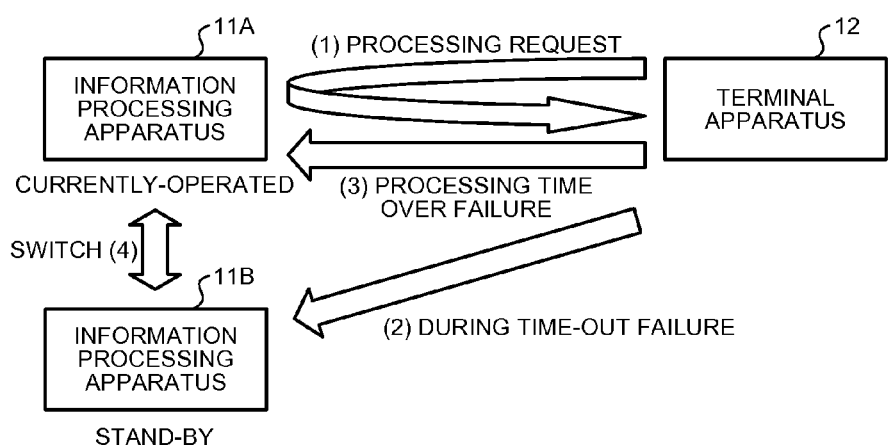
FIG. 10 is a diagram that illustrates an example of the flow of an operation of the information processing system.

As illustrated in FIG. 10, the terminal apparatus 12 receives a result of the processing request (FIG. 10 (1)). If the terminal apparatus 12 does not obtain a reply to the packet within the time-out period threshold so as to detect the occurrence of a time-out failure, it transmits, to the stand-by information processing apparatus 11B, the command statement for the switch command to switch from the currently-operated apparatus to the stand-by apparatus (FIG. 10 (2)). Conversely, if the occurrence of a processing-time over failure is detected, the transmission control unit 73 transmits, to the currently-operated information processing apparatus 11A, the command statement for the switch command to switch from the currently-operated apparatus to the stand-by apparatus (FIG. 10 (3)).

Thus, the information processing apparatus 11A and the information processing apparatus 11B are switched as the currently-operated apparatus and the stand-by apparatus (FIG. 10 (4)).

Figure 11:
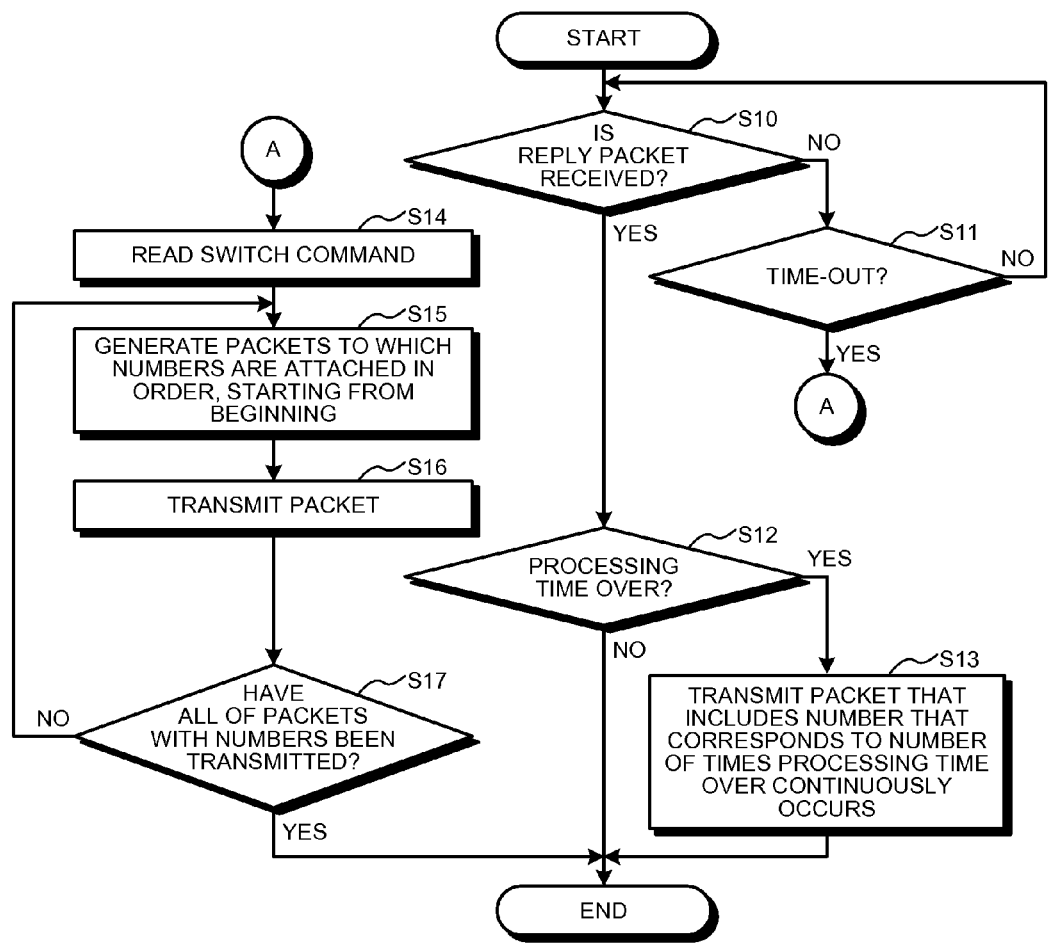
FIG. 11 is a flowchart that illustrates the steps of a control operation to perform control on switching after the terminal apparatus detects a failure.

Next, an explanation is given of the flow of various operations that are performed by the information processing system 10 according to the present embodiment. First, an explanation is given of the flow of a control operation to perform control on switching after the terminal apparatus 12 detects a failure. FIG. 11 is a flowchart that illustrates the steps of the control operation to perform control on switching after the terminal apparatus detects a failure. The control operation is performed at predetermined time, for example, at the time when a processing request is transmitted.

As illustrated in FIG. 11, the detecting unit 72 determines whether a reply packet is received in response to the processing request (S10). If a reply packet is not received (No at S10), the detecting unit 72 determines whether the time that is the time-out period threshold elapses after the packet of the processing request has been transmitted (S11). If the time that is the time-out period threshold has not elapsed (No at S11), the operation proceeds to the above-described S10.

If a reply packet is received (Yes at S10), the detecting unit 72 determines whether a processing time over is notified by the currently-operated information processing apparatus 11 (S12). If a processing time over is notified (Yes at S12), the transmission control unit 73 generates a packet in which the number that corresponds to the number of times a processing-time over failure is continuously detected is attached to the header area, transmits it to the currently-operated information processing apparatus 11 (S13), and terminates the operation. Conversely, if a processing time over is not notified (No at S12), the operation is terminated.

Conversely, if the time that is the time-out period threshold has elapsed (Yes at S11), the transmission control unit 73 reads the stand-by information processing apparatus 11's switch command that is stored in the configuration information table 61 (S14). The transmission control unit 73 generates packets in which the numbers stored in the switch command are attached to the header areas thereof in order, starting from the beginning (S15). The transmission control unit 73 transmits the generated packet to the stand-by information processing apparatus 11 (S16). The transmission control unit 73 determines whether all of the packets with the numbers stored in the switch command have been transmitted (S17). If all of the packets with the numbers stored in the switch command have not been transmitted (No at S17), the operation proceeds to the above-described S15. Conversely, if all of the packets with the numbers stored in the switch command have been transmitted (Yes at S17), the operation is terminated.

Figure 12:
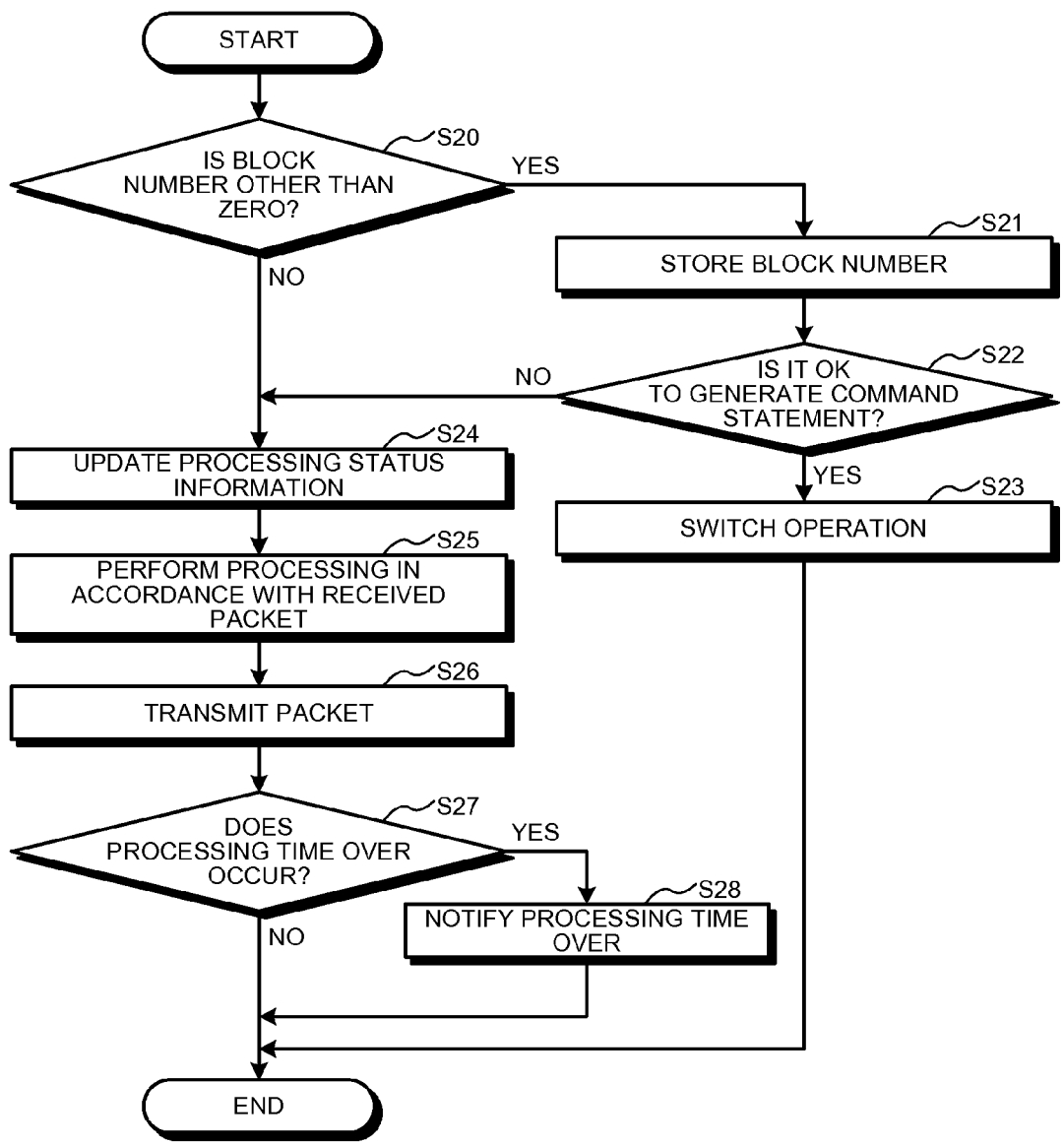
FIG. 12 is a flowchart that illustrates the steps of a control operation that is performed when the information processing apparatus receives a packet.

Next, an explanation is given of the flow of a control operation that is performed when the information processing apparatus 11 receives a packet. FIG. 12 is a flowchart that illustrates the steps of the control operation that is performed when the information processing apparatus receives a packet. The control operation is performed at predetermined time, for example, at the time when a packet is received.

As illustrated in FIG. 12, the switching unit 42 determines whether the number of the block of the command statement that is included in the header of the received packet is other than zero (S20). If the number of the block of the command statement that is included in the header is other than zero (Yes at S20), the switching unit 42 stores, in the received-command statement information 31, the number of the block of the command statement included in the header of the received packet (S21). Then, the switching unit 42 integrates the blocks that correspond to the number of divided blocks of the command statement in order, starting from the block of the newly received packet with the number, decompresses the integrated data, and determines whether it is possible to obtain the command statement for the switch command to switch between the stand-by apparatus and the currently-operated apparatus (S22). If the command statement for the switch command is obtained (Yes at S22), the switching unit 42 performs a switch operation to switch between the currently-operated apparatus and the stand-by apparatus (S23) and terminates the operation.

Conversely, if the number of the block of the command statement included in the header is zero (No at S20) or if the command statement for the switch command is not obtained (No at S22), the application processing unit 41 updates the processing status information 32 in accordance with the received packet (S24). Then, the application processing unit 41 performs processing in accordance with the received packet (S25). For example, if the received packet is a processing request, the application processing unit 41 performs processing of the application in accordance with the processing request. When the application processing unit 41 completes the processing, it transmits, to the terminal apparatus 12, the packet of a reply in response to the received packet (S26). The application processing unit 41 determines whether the processing period for processing the packet is longer than the processing time threshold, i.e., whether an processing time over occurs (S27). If a processing time over occurs (Yes at S27), the application processing unit 41 notifies the terminal apparatus 12 of the processing time over (S28) and terminates the operation. Conversely, if the processing period is not longer than the processing time threshold (No at S27), the operation is terminated.

As described above, the terminal apparatus 12 detects a failure of a reply to the packet that is transmitted to the currently-operated information processing apparatus 11A. If the terminal apparatus 12 detects a reply failure, it transmits, to the stand-by information processing apparatus 11B, multiple packets in which multiple divided command statements are attached to the header areas thereof, the divided command statements being obtained by dividing into multiple statements the command statement for the switch command to switch from the currently-operated apparatus to the information processing apparatus 11B. The information processing apparatus 11B stores, in the storage unit 51, each of the divided command statements that are attached to the packets that are transmitted from the terminal apparatus 12. The information processing apparatus 11B performs a switch operation to switch between the stand-by apparatus and the currently-operated apparatus when the command statement for the switch command can be generated from the divided command statements that are stored in the storage unit 51. Thus, as the terminal apparatus 12 transmits the divided command statements that are obtained by dividing the command statement for the switch command, the information processing system 10 can prevent leakage of the command statement. Furthermore, in the information processing system 10, the terminal apparatus 12 is capable of detecting the occurrence of a failure and switching between the currently-operated apparatus and the stand-by apparatus. Moreover, in the information processing system 10, a divided command statement is attached to the header area of a packet for exchanging data, such as a processing request, and a packet for transmitting a divided command statement is not separately transmitted; therefore, an increase in a communication traffic can be prevented.

Furthermore, the stand-by and the currently-operated information processing apparatuses 11 notify the terminal apparatus 12 of multiple divided command statements that are obtained by dividing into multiple statements the command statement for the switch command to give an instruction to switch between the stand-by apparatus and the currently-operated apparatus. Thus, the terminal apparatus 12 is capable of giving a switch instruction to both the stand-by and the currently-operated information processing apparatuses 11.

Furthermore, if the terminal apparatus 12 detects a communication time-out with regard to the currently-operated information processing apparatus 11A, it transmits a plurality of packets to the stand-by information processing apparatus 11B. Thus, the stand-by information processing apparatus 11B can be promptly switched to the currently-operated apparatus.

Furthermore, if the terminal apparatus 12 detects a processing time over in the currently-operated information processing apparatus 11A, it transmits, to the currently-operated information processing apparatus 11A, the packet that has the divided command statement attached to the header area thereof, the divided command statement having the number that corresponds to the number of times a failure is continuously detected. The currently-operated information processing apparatus 11A stores each of the divided command statements that are attached to the received packets and, when the command statement for the switch command can be generated by using the stored divided command statements, performs a switch operation to switch between the stand-by apparatus and the currently-operated apparatus. Thus, if a failure occurs in the currently-operated information processing apparatus 11A and a processing time over often occurs, it is possible to switch between the currently-operated apparatus and the stand-by apparatus. Furthermore, the currently-operated apparatus and the stand-by apparatus are not switched unless a command statement for a switch command can be generated by using divided command statements; therefore, it is possible to prevent the currently-operated apparatus and the stand-by apparatus from being switched too often due to a processing time over that temporarily occurs in the currently-operated information processing apparatus 11A.

[b] Second Embodiment

Although the embodiment of the disclosed apparatus is described above, the disclosed technology may be implemented by using various different embodiments other than the above-described embodiment. Therefore, an explanation is given below of another embodiment that is included in the present invention.

For example, according to the above-described embodiment, an explanation is given of a case where divided command statements are obtained by dividing a command statement for a switch command and the number of the divided command block is used; however, the disclosed apparatus is not limited to the above. For example, the information processing apparatus 11 may transmit, to the terminal apparatus 12, each of the command blocks that are divided and rearranged, and the terminal apparatus 12 may attach the block data to the header of a packet as the divided command statement for transmission.

Furthermore, according to the above-described embodiment, an explanation is given of a case where the information processing apparatus 11 detects a processing time over and notifies it to the terminal apparatus 12; however, the disclosed apparatus is not limited to the above. For example, the information processing apparatus 11 may notify the terminal apparatus 12 of a processing time and the terminal apparatus 12 may detect a processing time over.

Furthermore, the components of each apparatus illustrated are functionally conceptual and do not always need to be physically configured as illustrated in the drawings. Specifically, specific forms of separation and combination of units are not limited to those depicted in the drawings, and a configuration may be such that all or some of units are functionally or physically separated or combined in an arbitrary unit depending on various types of loads or usage. For example, the processing units, i.e., the notifying unit 40, the application processing unit 41, and the switching unit 42, of the information processing apparatus 11 illustrated in FIG. 2 may be combined as appropriate. Furthermore, the processing units, i.e., the identifying unit 70, the processing requesting unit 71, the detecting unit 72, and the transmission control unit 73, of the terminal apparatus 12 illustrated in FIG. 5 may be combined as appropriate. Furthermore, all or any of the various processing functions performed by the various processing units may be implemented by a CPU and a program that is analyzed and executed by the CPU or may be implemented as wired logic hardware.

Control Program

Figure 13:
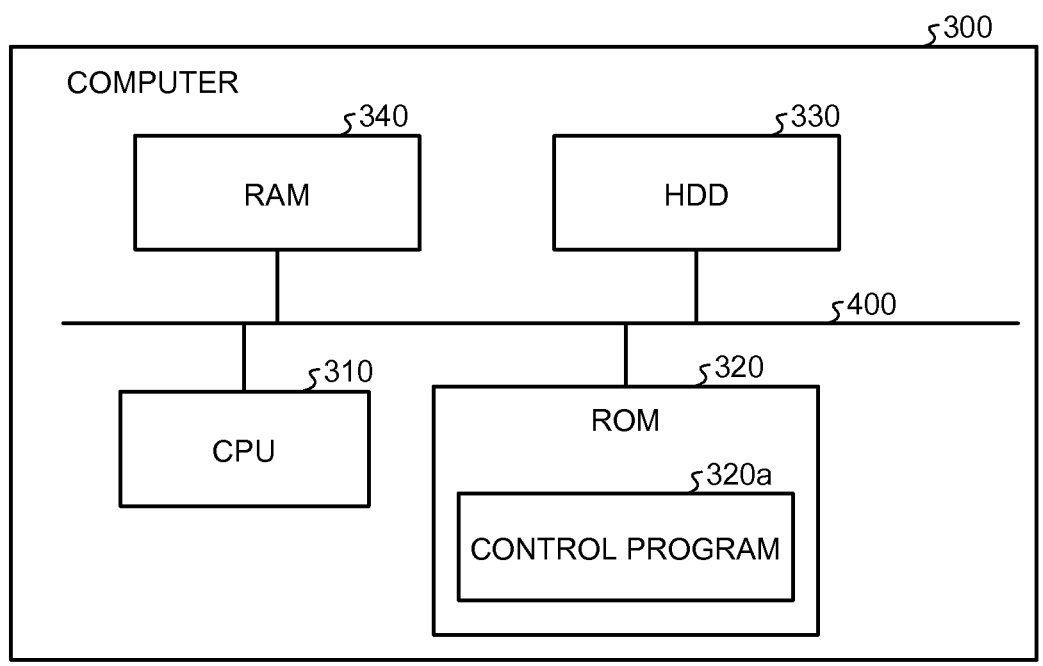
FIG. 13 is a diagram that illustrates a computer that performs a control program.

The various processes that have been described in the above-described embodiment may be performed if prepared programs are executed by a computer system, such as a personal computer or workstation. In the following, an explanation is given of an example of the computer system that performs a program that has the same functionality as that in the above-described embodiment. FIG. 13 is a diagram that illustrates a computer that performs a control program.

As illustrated in FIG. 13, a computer 300 includes a central processing unit (CPU) 310, a read only memory (ROM) 320, a hard disk drive (HDD) 330, and a random access memory (RAM) 340. The devices 310 to 340 are connected to one another via a bus 400.

The ROM 320 pre-stores a control program 320a for executing the same functionality as that of each of the processing units in the above-described embodiment. For example, it stores the control program 320a for executing the same functionalities as those of the notifying unit 40, the application processing unit 41, and the switching unit 42 of the information processing apparatus 11 in the above-described embodiment, or the identifying unit 70, the processing requesting unit 71, the detecting unit 72, and the transmission control unit 73 of the terminal apparatus 12. The control program 320a may be separated as appropriate.

The CPU 310 reads the control program 320a from the ROM 320 for execution, thereby performing the same operation as that in the above-described embodiment. Specifically, the control program 320a performs the same operations as those of the notifying unit 40, the application processing unit 41, and the switching unit 42 of the information processing apparatus 11, or the identifying unit 70, the processing requesting unit 71, the detecting unit 72, and the transmission control unit 73 of the terminal apparatus 12.

The above-described control program 320a does not always need to be initially stored in the ROM 320. The control program 320a may be stored in the HDD 330.

For example, the program is stored in a "portable physical medium", such as a flexible disk (FD), CD-ROM, DVD disk, magnet-optical disk, or IC card, which is inserted into the computer 300. The computer 300 may read the program from the above and execute it.

Furthermore, the program is stored in a "different computer (or server)", or the like, that is connected to the computer 300 via a public network, the Internet, LAN, WAN, or the like. Then, the computer 300 may read the program from the above and execute it.

According to an aspect of the present invention, leakage of command statements can be prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a terminal apparatus;
a currently-operated apparatus that receives a request from the terminal apparatus and performs processing in accordance with the request; and
a stand-by apparatus, wherein
the terminal apparatus includes
a detecting unit that detects a failure of a reply in response to a packet that is transmitted to the currently-operated apparatus; and
a transmission control unit that, when a failure of the reply is detected, transmits multiple packets to the stand-by apparatus, the packets having multiple divided command statements attached to header areas thereof, and the divided command statements being obtained by dividing into multiple statements a command statement for a switch command to switch from the currently-operated apparatus to the stand-by apparatus, and
the stand-by apparatus includes
a storage unit that stores each of the divided command statements that are attached to the packets that are transmitted from the terminal apparatus; and
a switching unit that performs a switch operation to switch from the currently-operated apparatus to the stand-by apparatus in accordance with the switch command that is generated from the divided command statements.

2. The information processing system according to claim 1, wherein the stand-by apparatus and the currently-operated apparatus further include a notifying unit that notifies the terminal apparatus of multiple divided command statements that are obtained by dividing into multiple statements a command statement for a switch command to give an instruction to switch between the stand-by apparatus and the currently-operated apparatus.

3. The information processing system according to claim 1, wherein
the detecting unit detects a communication time-out that occurs in the currently-operated apparatus when a reply to a packet is not obtained within a first time period after the packet is transmitted to the currently-operated apparatus, and
the transmission control unit transmits the packets to the stand-by apparatus when a communication time-out is detected.

4. The information processing system according to claim 1, wherein
the detecting unit detects a processing time over that occurs in the currently-operated apparatus when processing performed by the currently-operated apparatus on a packet continues for equal to or more than a second time period, and
when a processing time over is detected, the transmission control unit transmits, to the currently-operated apparatus, a packet in which a divided command statement with a number that corresponds to a number of times a failure is continuously detected is attached to a header area thereof, the divided command statement being included in multiple divided command statements that are obtained by dividing into multiple statements a command statement for a switch command to switch from the currently-operated apparatus to the stand-by apparatus and that are associated with numbers for transmission, and
the currently-operated apparatus further includes
a storage unit that stores each of the divided command statements that are attached to the packets that are transmitted from the terminal apparatus; and
a switching unit that performs a switch operation to switch between the stand-by apparatus and the currently-operated apparatus when a command statement for the switch command is generable from the divided command statements that are stored in the storage unit.

5. An information processing apparatus being a stand-by apparatus that is a counterpart of a currently-operated apparatus that receives a request from a terminal apparatus and performs processing in accordance with the request, comprising:

a memory; and a processor connected to the memory, wherein the processor executes a process comprising:

storing, in the memory, multiple divided command statements that are attached to header areas of packets that are received by a receiving unit and are transmitted from the terminal apparatus, the divided command statements being obtained by dividing into multiple statements a command statement for a switch command to switch from the currently-operated apparatus to the stand-by apparatus; and switching from the currently-operated apparatus to the stand-by apparatus in accordance with the switch command that is generated from the divided command statements.

6. A terminal apparatus that transmits a request to a currently-operated apparatus that performs processing in accordance with the request, the terminal apparatus comprising:

a processor, wherein the processor executes a process comprising:

detecting a failure of a reply in response to a packet that is transmitted to the currently-operated apparatus; and when a failure of the reply is detected, transmitting, to a stand-by apparatus that is a counterpart of the currently-operated apparatus, multiple packets in which multiple divided command statements are attached to header areas thereof, the divided command statements being obtained by dividing into multiple statements a command statement for a switch command to switch from the currently-operated apparatus to the stand-by apparatus.

7. A non-transitory computer-readable recording medium having stored therein a control program for an information processing apparatus that is a counterpart of a currently-operated apparatus that receives a request from a terminal apparatus and performs processing in accordance with the request, for causing a computer to execute a process, the process comprising:

storing, in a storage unit, multiple divided command statements that are attached to header areas of packets that are received by a receiving unit and are transmitted from the terminal apparatus, the divided command statements being obtained by dividing into multiple statements a command statement for a switch command to switch from the currently-operated apparatus to the stand-by apparatus; and switching from the currently-operated apparatus to the stand-by apparatus in accordance with the switch command that is generated from the divided command statements.

8. A non-transitory computer-readable recording medium having stored therein a control program for a terminal apparatus that transmits a request to a currently-operated apparatus that performs processing in accordance with the request, for causing a computer to execute a process, the process detecting a failure of a reply in response to a packet that is transmitted to the currently-operated apparatus; and when a failure of the reply is detected, transmitting, to a stand-by apparatus that is a counterpart of the currently-operated apparatus, multiple packets in which multiple divided command statements are attached to header areas thereof, the divided command statements being obtained by dividing into multiple statements a command statement for a switch command to switch from the currently-operated apparatus to the stand-by apparatus.

9. A control method for an information processing system including a terminal apparatus;

a currently-operated apparatus that receives a request from the terminal apparatus and performs processing in accordance with the request; and a stand-by apparatus, the control method for causing the terminal apparatus to execute:

detecting a failure of a reply in response to a packet that is transmitted to the currently-operated apparatus; and when a failure of the reply is detected, transmitting multiple packets to the stand-by apparatus, the packets having multiple divided command statements attached to header areas thereof, and the divided command statements being obtained by dividing into multiple statements a command statement for a switch command to switch from the currently-operated apparatus to the stand-by apparatus, and the control method for causing the stand-by apparatus to execute:

storing, in a storage unit, each of the divided command statements that are attached to the packets that are transmitted from the terminal apparatus; and switching from the currently-operated apparatus to the stand-by apparatus in accordance with the switch command that is generated from the divided command statements.

* * * * *